UNITED STATES PATENT OFFICE.

FREDERICK HOHLWEG, OF SAN FRANCISCO, CALIFORNIA.

PROCESS OF OBTAINING MAGNESIUM SULPHATE FROM CRUDE MINERAL.

SPECIFICATION forming part of Letters Patent No. 259,150, dated June 6, 1882.

Application filed July 27, 1881. (No specimens.)

*To all whom it may concern:*

Be it known that I, FREDERICK HOHLWEG, a subject of the Emperor of Germany, and residing at San Francisco, in the county of San Francisco and State of California, have invented or discovered a new and useful Process or Means of Obtaining Sulphate and Carbonate of Magnesia from the Crude or Native Mineral; and I do hereby declare that the following is a full, clear, and exact description of the invention, which will enable others skilled in the art to which it appertains to make and use the same.

Heretofore various processes have been adopted in obtaining sulphate of magnesia and carbonate of magnesia from crude mineral, among which is the roasting of the mineral and exposing it to the action of air and water for some months. It is then lixiviated, the sulphate of iron decomposed by lime-water, and the salt obtained by repeated solution and crystallization.

William Henry, of Manchester, England, obtained a patent for a mode of preparing magnesia and its salts from the double carbonate of magnesia and lime—the dolomite of mineralogists. His process was to drive off the carbonic acid by heat and to convert the remaining earths into hydrates. These were treated with muriatic acid to dissolve out the lime, and then the magnesia was converted into a sulphate either by sulphuric acid or sulphate of iron.

In the treatment of the silicious hydrate of magnesia, where but little lime is present, the practice has been to reduce the mineral to a fine powder and saturate with sulphuric acid. The mass is then dried and calcined at a red heat in order to convert the sulphate of iron which may be present into red oxide. It is then dissolved in water and sulphate of lime added to separate any remaining portion of iron. The salt is crystallized and dissolved a third time in order to purify it. These methods, however, are laborious and expensive and require much time, and much of the muriatic acid and sulphuric acid employed is lost. In my process, however, no appreciable loss is sustained, for the reason that I employ the bisulphate of soda or waste product obtained from the manufacture of nitric acid and in the manufacture of alum from cryolite, and which waste product is now discarded as worthless.

To carry my invention into effect I take the crude mineral containing carbonate or silicate of magnesia and reduce it to a fine powder and mix with it, either when pulverizing or afterward, about six (6) times its weight of bisulphate of soda. The whole is placed in a tank or vat with a suitable quantity of water, in which condition it is kept for about twenty-four hours and occasionally agitated by stirring the mass. By this means one equivalent of the sulphuric acid contained in the bisulphate of soda combines with the magnesia, from which action a mixture of sulphate of soda and sulphate of magnesia is obtained. To the resulting solution of sulphate of soda and sulphate of magnesia I add carbonate of soda in quantity required to precipitate the magnesia from the solution as a carbonate in the usual manner. Should iron be present in the mixture, this may be removed in the usual way, and the pure sulphate of magnesia may be obtained from the solution by successive evaporation and crystallization, the sulphate of soda having been first removed by evaporation and crystallization, and afterward the sulphate of magnesia.

It should here be observed that the carbonate of magnesia may be obtained either from the pure sulphate of magnesia as manufactured in the above manner or it may be precipitated directly from the solution of sulphate of soda and sulphate of magnesia, in the usual manner, with carbonate of soda.

I am aware that powdered gypsum has been suspended in water with neutral carbonate of magnesia, so as to form a solution of sulphate of magnesia with a residuum of lime; but this I do not claim.

Having thus described my invention, what I claim, and desire to secure by Letters Patent, is—

1. The process of obtaining magnesium sulphate from crude mineral—such as dolomite or magnesian silicates—by treating the powdered mineral with a solution of sodium bisulphate and separating the magnesium sulphate by crystallization, substantially as described.

2. The process of obtaining carbonate of magnesia from its crude mineral—such as dolomite or magnesian silicates—which consists in reducing the same to a fine powder and mixing with it the bisulphate of soda in solution, from which the magnesia is precipitated as carbonate in the usual manner, substantially as specified.

In testimony that I claim the foregoing I have hereunto set my hand and seal this 13th day of July, 1881.

FREDERICK HOHLWEG. [L. S.]

Witnesses:
 C. W. M. SMITH,
 CHARLES E. CHENERY.